(12) United States Patent
Rowe et al.

(10) Patent No.: US 7,117,976 B2
(45) Date of Patent: Oct. 10, 2006

(54) LUBRICATING SYSTEM AFFIXED TO A ROTARY SHAFT

(76) Inventors: S. Darrell Rowe, 840 Westwood Ct., West Point, VA (US) 23181; Thomas E. Daniels, P.O. Box 264, Gwynn, VA (US) 23066

( * ) Notice: Subject to any disclaimer, the term of this patent is extended or adjusted under 35 U.S.C. 154(b) by 603 days.

(21) Appl. No.: 10/642,230

(22) Filed: Aug. 18, 2003

(65) Prior Publication Data

US 2005/0039986 A1    Feb. 24, 2005

(51) Int. Cl.
*F01M 11/00* (2006.01)

(52) U.S. Cl. .................................... 184/6.28

(58) Field of Classification Search ........... 184/6.28; 464/7; 384/322, 462
See application file for complete search history.

(56) References Cited

U.S. PATENT DOCUMENTS

| | | | | |
|---|---|---|---|---|
| 1,545,628 | A | * | 7/1925 | Wolk ............................... 184/6 |
| 2,727,369 | A | * | 12/1955 | Fawick ......................... 464/72 |
| 4,072,028 | A | * | 2/1978 | Connell ........................ 464/54 |
| 4,327,950 | A | * | 5/1982 | Czuszak ..................... 384/404 |
| 4,700,808 | A | | 10/1987 | Haentjens |
| 4,799,574 | A | | 1/1989 | Bras |
| 5,333,704 | A | | 8/1994 | Hoff |
| 5,558,180 | A | | 9/1996 | Yanagisawa |
| 5,732,794 | A | | 3/1998 | Orlitzky |
| 5,950,764 | A | | 9/1999 | Helbig |
| 5,971,229 | A | | 10/1999 | May et al. |
| 6,102,804 | A | | 8/2000 | Kretschmer et al. |
| 6,125,969 | A | | 10/2000 | Graf et al. |
| 6,179,470 | B1 | | 1/2001 | Huddleston et al. |
| 6,405,810 | B1 | | 6/2002 | Grach et al. |
| 6,450,790 | B1 | * | 9/2002 | Fukuoka ....................... 418/46 |
| 6,474,115 | B1 | * | 11/2002 | Preston et al. ................ 68/140 |
| 6,478,116 | B1 | | 11/2002 | Klausen et al. |
| 6,557,651 | B1 | | 5/2003 | Norby et al. |
| 2002/0079336 | A1 | | 6/2002 | Weigand et al. |
| 2002/0144864 | A1 | | 10/2002 | Kramer |
| 2003/0010572 | A1 | | 1/2003 | Henry et al. |
| 2003/0031554 | A1 | | 2/2003 | Rockwood |
| 2003/0075043 | A1 | | 4/2003 | Rake |

FOREIGN PATENT DOCUMENTS

DE      10054712      5/2002
EP       704654       4/1996

* cited by examiner

*Primary Examiner*—Chong H Kim
(74) *Attorney, Agent, or Firm*—Richard C. Litman (57) ABSTRACT

A lubricating system is affixed to and rotates with a rotary drive shaft, and provides automatic lubrication of the rotating bearings of a universal joint or similar articulated juncture in the shaft while the shaft is rotating. The present system includes a series of conventional automatic lubricators which are affixed to the shaft by a novel bracket. The bracket components provide for installation from the sides of the shaft, in order to avoid any requirement to disconnect the shaft at one end to pass the bracket over the end of the shaft. Each component group securing each side of the bracket portions together is configured to closely balance the weight of one lubricator in a partially depleted state, in order to avoid any undue balance problems on the shaft.

17 Claims, 3 Drawing Sheets

LUBRICATING SYSTEM AFFIXED TO A ROTARY SHAFT

BACKGROUND OF THE INVENTION

1. Field of the Invention

The present invention relates generally to automated lubricating systems, and more specifically to a lubricating system which is affixed to a rotating drive shaft or the like and which rotates with the shaft. The present lubricating system supplies lubrication at intervals for bearings located at rotating universal joints and similar driveline junctures where it is not possible to provide a stationary lubrication fitting.

2. Description of the Related Art

Universal joints, constant velocity (CV) joints, and similar components are often designed to require periodic lubrication. While the automotive industry has generally turned to permanently lubricated joints, many types of large machinery utilize relatively large U-joints and the like, with such large joints generally requiring periodic lubrication for the bearings therein. This is true in many industries, e.g. maritime shipping and various machines used in heavy industry, most particularly large paper manufacturing machines. In many cases such machines are run essentially continually, as starting and stopping the machines and their production at the end of a workday or workweek cannot be justified economically.

Conventional lubricating systems for such drive line fittings, require the machine to be shut down periodically in order to stop the joint and access the lubrication fitting(s) thereon. Down time for such a machine may be on the order of $300 per minute or $18,000 per hour, depending upon the size and production capacity of the machine. The requirement to employ mechanics to lubricate the driveline systems adds further to the cost of maintaining such a machine. The alternative of running the machine until damage occurs due to lack of lubrication is even less desirable. The down time noted above is only one of the factors, which must be considered when a machine is shut down due to damage. The removal, repair, and installation time and costs involved in the repair of a large driveline are considerable in very large machinery.

Accordingly, a need will be seen for a lubrication system which may be affixed to a rotary shaft, and which provides periodic lubrication on demand for universal joints and/or other fittings on the shaft, which require periodic lubrication. The present invention responds to this need by means of a bracket assembly affixed around the diameter of the drive shaft, with the bracket holding a plurality of automated lubrication dispensers therein. The conventional lubrication or grease fittings located at the universal joint trunnions are removed, and lubricant distribution and supply lines are connected between the universal join grease fitting receptacles and the lubrication dispensers secured within the bracket of the present invention. The dispensers may be controlled by internal timers, radio signals, or other means which do not require any form of direct physical connection between the rotating apparatus and a stationary controller, to dispense lubricant periodically as required by the equipment without any requirement to shut down or stop the operation of the equipment.

A discussion of the related art of which the present inventors are aware, and its differences and distinctions from the present invention, are provided below.

U.S. Pat. No. 4,700,808 issued on Oct. 20, 1987 to Walter D. Haentjens, titled "Shaft Mounted Bearing Lubricating Device," describes an annular lubrication system wherein the lubricant supply surrounds a stationary housing. A set of impeller blades attached to the rotating inner shaft dips into the lubricant supply to splash oil to the bearings in the assembly. The Haentjens lubrication system can only be used with shaft assemblies having essentially vertical orientations, due to the annular oil supply surrounding the stationary external housing; no means is provided for lubricating multiple points on a rotating shaft. In contrast, the present lubrication system is not sensitive to orientation, and the entire system is affixed to the rotating shaft, rather than having a portion of the system affixed to a stationary structure as in the Haentjens device.

U.S. Pat. No. 4,799,574 issued on Jan. 24, 1989 to Johan C. M. Bras, titled "Lubrication Device," describes a generally conventional lubricant reservoir for affixing to a stationary lubrication port on a machine or the like. The Bras device includes a spring motor for periodically opening a passage to allow lubricant to flow from the device, with the motor being controlled by an electronic timing circuit. The Bras apparatus is incapable of lubricating multiple points on a rotating shaft and cannot be secured in its entirety to such a rotating shaft, as provided by the present invention.

U.S. Pat. No. 5,333,704 issued on Aug. 2, 1994 to John Hoff, titled "Rotating Lubricating Technique For Equipment," describes a lubricating system for the chain drive of a wheeled irrigation machine. The Hoff lubricating system comprises an oil reservoir which rotates with wheel rotation, to dispense a measured amount of oil to a distribution channel which provides oil to the chain drive. The Hoff system can only operate at relatively low wheel rotational speeds, as centrifugal force would result in the oil being thrown to the outer or upper portion of the reservoir and dispensed constantly. It is also noted that the distribution channels of the Hoff lubrication system are fixed relative to the rest of the structure, and do not rotate with wheel rotation.

U.S. Pat. No. 5,558,180 issued on Sep. 24, 1996 to Kiyoshi Yanagisawa, titled "Bearing Lubricating Apparatus For Rotary Machine," describes a system having a rotary mechanism and shaft disposed within a stationary housing. The Yanagisawa apparatus includes a disc which passes through the oil reservoir during rotation of the shaft, to throw oil where it can be gathered for distribution to the bearings. As with other similar systems, the Yanagisawa system cannot operate with heavier viscosity lubricants and includes stationary components.

U.S. Pat. No. 5,732,794 issued on Mar. 31, 1998 to Anton T. Orlitzky, titled "Auger-Driven Automatic Lubricator," describes an oiling device similar to that of the Bras '574 U.S. Patent discussed further above. The Orlitzky lubricator includes an electronic timing device to direct the lubricator to deliver lubrication at certain predetermined times. However, the Orlitzky lubricator still cannot be installed upon a rotating device or structure, and cannot deliver lubrication to a plurality of bearings simultaneously, as can the present invention.

U.S. Pat. No. 5,950,764 issued on Sep. 14, 1999 to Claus Helbig, titled "Lubricating Device For Rotating Parts, Especially A Rotating Hollow Shaft," describes a relatively complex system which is completely contained concentrically within a rotating assembly. The Helbig device includes centrifugal switches which in turn causes a gas to be generated to pressurize the lubricant delivery system. The system provides lubrication for two concentric telescoping shafts, and cannot lubricate the plurality of separate bearings of a universal joint trunnion or the like, as provided by the present lubrication system.

U.S. Pat. No. 5,971,229 issued on Oct. 26, 1999 to Anton May et al., titled "Automatic Lubricant Dispenser," describes another lubricator device with lubricant reservoir, configured for a stationary installation. The May et al. device closely resembles the lubricator of the Orlitzky '794 U.S. Patent discussed further above, but is actuated by a manually operated switch on the top of the device. Accordingly, the May et al. cannot be installed on a rapidly rotating piece of equipment, as the actuation switch would not be accessible.

U.S. Pat. No. 6,102,804 issued on Aug. 15, 2000 to Horst Kretschmer et al., titled "Lubricating Device For Lubricating The Profiled Tubes Of A Telescopic Shaft," describes a lubrication system performing a similar function to that of the Helbig '764 U.S. Patent discussed further above. While FIG. 1 of the Kretschmer et al. drawings shows a telescoping tube assembly with a U-joint on each end, no lubrication to the U-joint bearings is provided. The Kretschmer et al. lubrication system is directed only to lubrication of the two sliding telescoping tubes, and not to any external bearings at either end of the tube assembly.

U.S. Pat. No. 6,125,969 issued on Oct. 3, 2000 to Walter Graf et al., titled "Method Of And Apparatus For Lubricating An Apparatus Having A Number Of Lubricant Locations," describes a lubricating device quite similar to that described in the '229 U.S. Patent to May, described further above. It is noted that May is the second inventor in the Graf 969 U.S. Patent. The primary difference between the two devices is that the lubricator of the Graf et al. '969 U.S. patent includes electronic means to count the number of revolutions of a rotating component and dispense lubricant accordingly. The Graf et al. '969 U.S. Patent also describes the use of a plurality of such devices to lubricate a corresponding plurality of lubrication points. However, no mounting or attachment to a rotating structure is disclosed, as provided by the present invention.

U.S. Pat. No. 6,179,470 issued on Jan. 30, 2001 to H. Mike Huddleston et al., titled "Self-Lubricating Bearing," describes a lubrication system for a sleeve bearing in a centrifugal clutch assembly. The bearing is described as being porous, i.e., an Oilite® bearing or the like. One or more circumferential grooves are formed in the structure surrounding the bearing, and the grooves are packed with grease. Huddleston et al. do not provide any means for lubricating the bearing at predetermined periodic intervals, nor for lubricating a series of separate rotating bearings, as provided by the present invention.

U.S. Pat. No. 6,405,810 issued on Jun. 18, 2002 to Ayzik Grach et al., titled "Method Of Lubricating And Lubricant Spraying Apparatus," describes a lubricant spray device which is synchronized with the rotation of a rotating object to spray lubricant only upon a certain portion of the object at each revolution. The lubricant supply and sprayer components are stationary relative to the rotating object and are not in direct contact with the object being lubricated, unlike the present lubrication system.

U.S. Pat. No. 6,478,116 issued on Nov. 12, 2002 to Jorn H. Klausen et al., titled "Lubricating Oil Supplying Arrangement For An Apparatus Having A Rotating Apparatus Shaft," describes a multi-lobe rotary oil pump which is internally installed and concentric with a rotating shaft. The Klausen et al. pump cannot provide lubrication to multiple bearing locations from a corresponding number of externally disposed lubricating devices, as provided by the present lubricating system invention.

U.S. Pat. No. 6,557,651 issued on May 6, 2003 to Duane E. Norby et al., titled "Automated Lubricant Dispensing System And Method For A Horizontal Directional Drilling Machine," describes a lubricating system for use with machine tools, for lubricating the workpiece and cutting tool during machining operations. Such lubrication is completely different than that used in the present invention, as cutting tool lubrication is contaminated by material removed from the workpiece and must be filtered and processed if it is to be reused. The cutting oils or lubricants used for such operations are also considerably lighter than the lubricants used in bearings and the like. In any event, the Norby et al. lubrication system is stationary and does not rotate with the cutting tool, but sprays the lubricant onto the rotating cutting tool during the machining operation.

U.S. Patent Application Publication No. 2002/79,336 published on Jun. 27, 2002 to Michael Weigand et al., titled "Lubricant Dispenser," describes a device similar to those disclosed in the '229 U.S. Patent to May and '969 U.S. Patent to Graf, both of which have been described further above. While such lubricators may be used with the present invention, it is noted that Weigand et al. do not provide any means for securing their lubricator to a rotating object, nor do they provide an installation having a series of such lubricators installed on a rotating object and connected to a corresponding series of separate bearings on the rotating object, as provided by the present lubricating system invention.

U.S. Patent Application Publication No. 2002/144,864 published on Oct. 10, 2002 to Siegfried Kramer, titled "Multi-Point Lubrication Distribution System," describes a single, centrally located lubricant reservoir and pump which supplies lubricant to a series of bearings or the like by means of a manifold and rotary distributor which sequences the delivery of lubricant to each location. The lubricant reservoir and pump of the Kramer system appear to be quite similar to those described in the '229 U.S. Patent to May, the '969 U.S. Patent to Graf, and the '336 U.S. Patent Publication to Weigand et al., each of which have been described further above. As in the other devices of which the present inventors are aware, Weigand et al. do not disclose any means of mounting such a lubricant system on a rotating object. Moreover, the Kramer et al. device teaches away from such an installation, due to the imbalance which would be created by attaching only one such lubricator to one side of a rotating object.

U.S. Patent Application Publication No. 2003/10,572 published on Jan. 16, 2003 to Mark S. Henry et al., titled "Lubrication System For A Bearing," describes a device having a single stationary oil supply which delivers oil to a fan installed within the hub of the rotating assembly. The fan draws air and oil from the lubricant system into the rotating assembly, to lubricate the bearings therein. Henry et al. do not disclose any specific type of lubrication reservoir and pump system for use with their invention, and disclose only a single such lubrication supply.

U.S. Patent Application Publication No. 2003/31,554 published on Feb. 13, 2003 to Robert E. Rockwood, titled "Centrifugal Pump Having Oil Misting System With Pivoting Blades," describes a device having a series of radially disposed oil splash blades hingedly secured to a rotary shaft. The blades pick up oil from a stationary reservoir, and sling the oil within the reservoir and housing to lubricate components therein. Rockwood does not provide a series of lubricant reservoirs and dispensing units affixed to a rotating shaft for lubricating a series of separate bearings on the shaft, as provided by the present lubricating system invention.

U.S. Patent Application Publication No. 2003/75,043 published on Apr. 24, 2003 to Brad Rake, titled "Apparatus And Method For Lubricant Condition Control And Monitoring From A Remote Location," describes a device for detecting humidity buildup in an oil supply, and drying the oil by injecting dry air into the system. The Rake system includes a stationary dryer system which is connected to a stationary oil supply at the bearings of the shaft of the device being lubricated. None of the components of the Rake assembly are affixed to any of the rotating components of the device being lubricated, nor does Rake disclose multiple lubricators servicing a corresponding number of lubrication points on a rotating shaft, as provided by the present invention.

European Patent Application Publication No. 704,654 published on Apr. 3, 1996 to Anton Orlitzky, titled "Auger-Driven Automatic Lubricator," is the European filing of the '794 U.S. Patent to the same inventor, discussed further above. The same points of difference between the '794 U.S. Patent to Orlitzky and the present invention are seen to apply here as well.

Finally, German Patent Publication No. 10,054,712 published on May 29, 2002, describes a device which is very similar to the lubricator of the Helbig '764 U.S. Patent discussed further above. The same points of difference noted in the discussion of the Helbig '764 U.S. Patent are seen to apply here as well.

None of the above inventions and patents, taken either singly or in combination, is seen to describe the instant invention as claimed. Thus a lubricating system affixed to a rotary shaft solving the aforementioned problems is desired.

SUMMARY OF THE INVENTION

The present lubricating system is affixed to a rotary shaft and includes a series of lubricator devices which supply lubrication to a corresponding number of bearings which rotate with the shaft. The present invention may be adapted to a number of different shaft configurations, but is particularly well suited for installation on a relatively large shaft to provide lubrication for the trunnion bearings of a large universal joint or joints on the shaft. The lubricators used with the present invention are conventional and commercially available. Such lubricators may be configured to dispense their lubricant automatically by means of a timer mechanism installed in each lubricator, or alternatively by electromagnetic signal or other means which does not require physical connection between the lubricators and a stationary control point. The lubricators are secured to the rotating shaft by a novel bracket, which captures the lubricators on the shaft and also secures the lubrication lines extending from the lubricators toward their corresponding bearings. The bracket of the present invention is configured to allow it to be assembled from the sides of the shaft, in order to preclude any need to disassemble the shaft and pass a closed bracket over one end of the shaft. Each component group securing each side of the bracket portions together is configured to closely balance the weight of one lubricator in a partially depleted state, in order to avoid any undue balance problems on the shaft.

Accordingly, it is a principal object of the invention to provide a multiple point lubricating system for a rotating shaft, which lubricating system in its entirety is affixed to and rotates with the rotating shaft.

It is another object of the invention to provide such a lubrication system which automatically lubricates the rotating lubrication points on the shaft, without need to stop the rotary motion of the shaft in order to perform the lubrication.

It is a further object of the invention to provide a bracket for such a lubrication system for securing a plurality of lubricating devices to the shaft, each of which devices is connected to a corresponding lubrication point on the shaft.

Still another object of the invention is to provide such a lubrication system which bracket may be secured around and removed from the shaft as desired without need to disconnect the shaft from its attachment points.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention comprises a system or apparatus for lubricating the rotating bearings of a rotating shaft. The device is particularly well suited for the lubrication of relatively large roller or ball bearings as used in the trunnions of universal joints in very large drive shafts and the like, as used in various types of heavy machinery such as papermaking machines, mining machinery and equipment, large ships, and other equipment using very large articulated drive shafts. Such equipment is often in operation round the clock, with shutdown for maintenance and lubrication being costly due to the loss of productivity. The present invention provides a solution to the problem of lubricating the rotating bearings in a rotating shaft, by providing a bracket holding a series of automated lubricators therein, with the bracket and lubricators being affixed to and rotating with the drive shaft.

Figure 1:
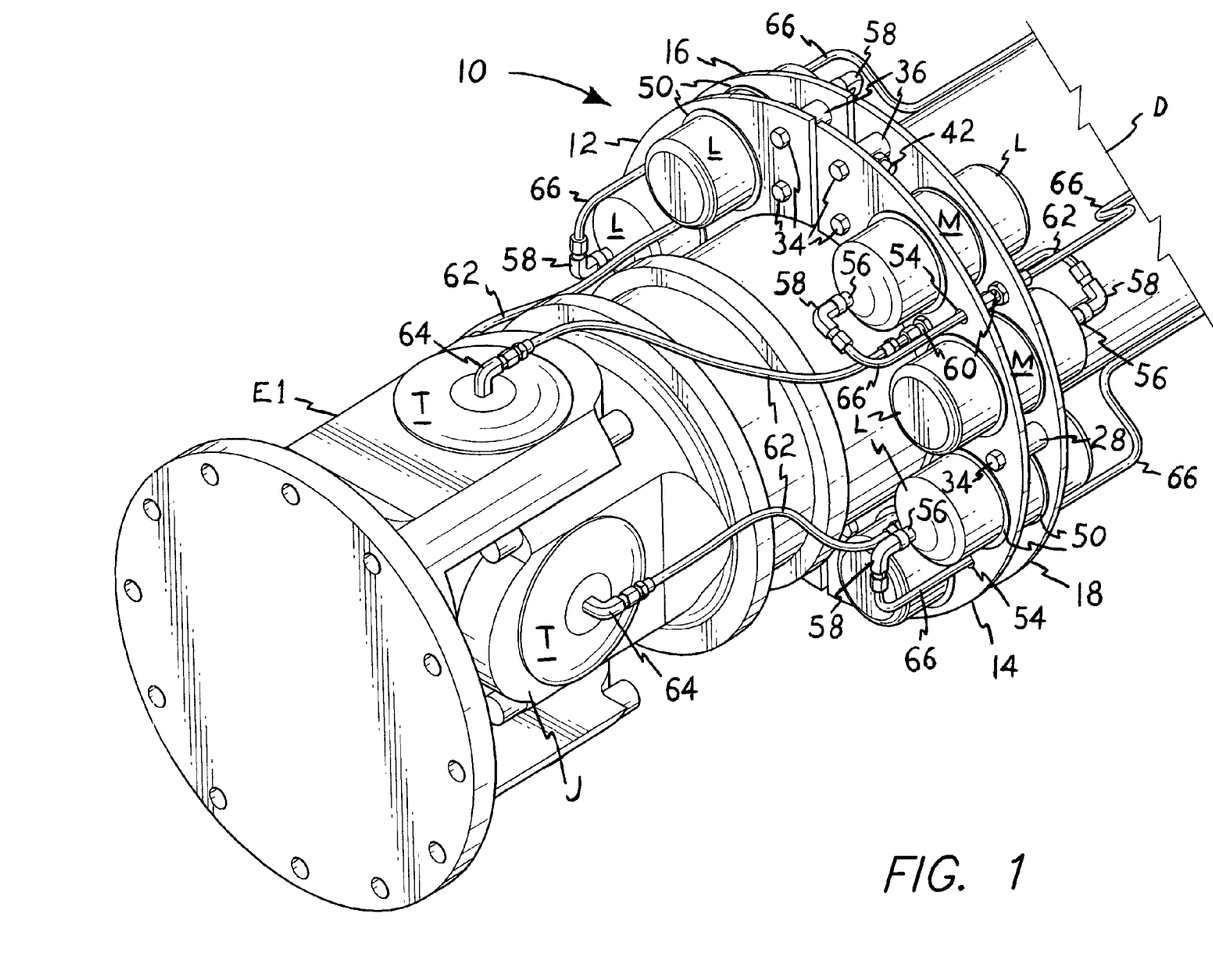
FIG. 1 is an environmental, perspective view of a lubricating system affixed to a rotary shaft according to the present invention, showing its various features.
Figure 2:
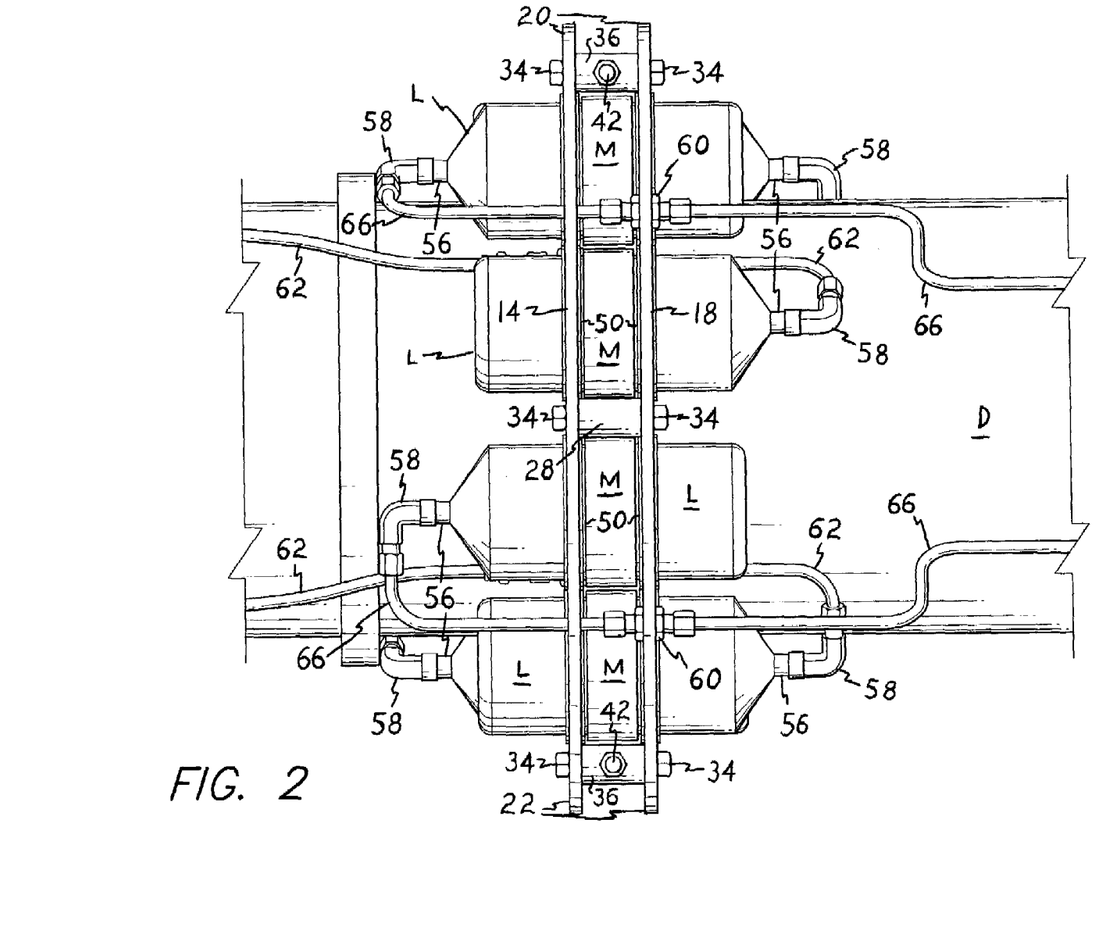
FIG. 2 is a side elevation view of the present lubricating system installed on a rotary shaft, showing further details thereof.

FIGS. 1 and 2 respectively provide environmental perspective and environmental side elevation views of the present lubricating system installed on a large rotating drive shaft D, as used in large papermaking machines and the like. The drive shaft D is conventional, having a first bearing end E1 and an opposite second bearing end, not shown but understood to be essentially a mirror image configuration to the first end E1. Each end has an articulated attachment to its respective connection point, e.g. a drive motor or gear reduction system or driven element of the machine, etc. The articulated attachment may be a conventional universal joint structure J having four trunnions T (two of which are shown in FIG. 1), each having a conventional internal roller or ball bearing assembly (not shown) which requires periodic lubrication. Such assemblies are conventionally provided with a lubrication (grease) fitting, to which grease or other lubricant is applied periodically when the drive system is stopped.

Figure 3:
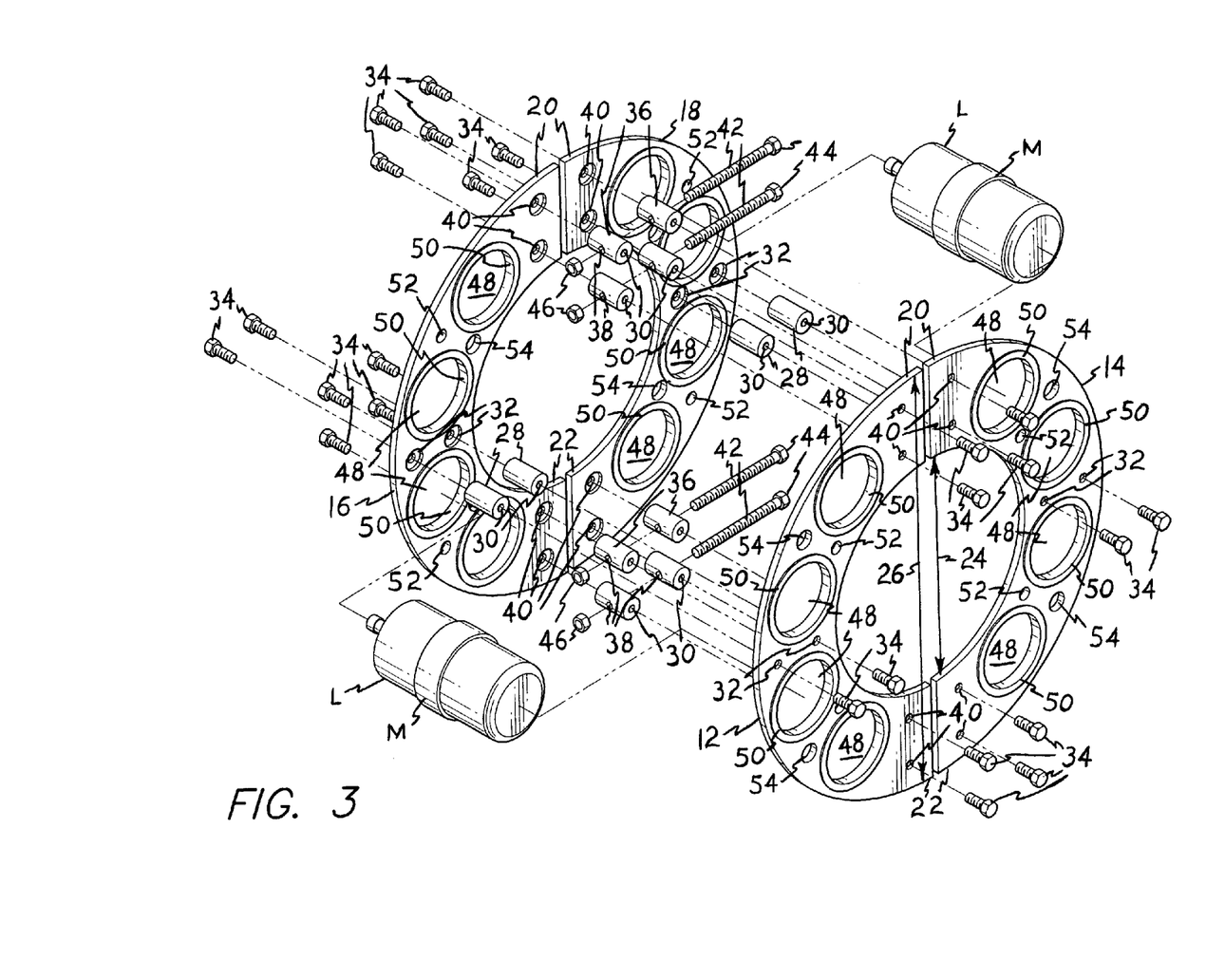
FIG. 3 is an exploded perspective view of the various components comprising the present lubricating system.

The present invention removes any need to stop the machinery in order to lubricate the bearings of the universal joint trunnions T, by means of a bracket assembly 10 which is affixed to the drive shaft D and rotates therewith. The bracket assembly 10 comprises a series of first through fourth bracket portions, respectively 12 through 18, with each bracket portion having a semicircular configuration with a first end 20, opposite second end 22, an inner diameter 24 dimensioned to fit closely about the drive shaft D, and a larger outer diameter 26; the ends 20 and 22 and the inner and outer diameters 24 and 26 are indicated in FIG. 3. The various bracket portions 12 through 18 are preferably formed of aluminum, in order to reduce the rotational mass of the assembly. However, other materials (e.g., steel plate, heavy plastics, etc.) may be used as desired, depending upon the diameter and rotational speed of the drive shaft, the masses of the lubrication devices and attachment hardware installed in the bracket, etc.

The various bracket portions 12 through 18 are assembled about the drive shaft D with the first and second bracket portions 12 and 14 placed opposite one another to essentially encircle the drive shaft D, and in the same plane. The third and fourth bracket portions 16 and 18 are placed about the drive shaft D in the same manner, but spaced apart from the first and second bracket portions 12 and 14. A series of bracket portion spacer fittings are installed between the parallel first and third bracket portions 12 and 16 and between the parallel second and fourth bracket portions 14 and 18, to secure those parallel components in their proper relationship to one another. The bracket portion spacer fittings comprise a series of medial spacers 28, with each of the spacers 28 having a threaded concentric axial passage 30 therethrough. A corresponding number of medial spacer attachment passages 32 are formed through the medial portion of each of the bracket portions 12 through 18, with these passages 32 preferably being counterbored in their facing surfaces to the diameter of the medial spacers 28 to facilitate assembly.

At least one, and preferably a pair, of such medial spacers 28 are placed between the corresponding parallel bracket portions 12, 16 and 14, 18, seated in the counterbores of the medial spacer attachment passages 32 and secured in place by opposed bracket assembly bolts 34 installed through each of the parallel bracket portions 12, 16 and 14, 18 and into the opposite ends of the medial spacers 28. The bracket assembly bolts 34 have drilled heads (not shown) for safety wiring, or other means to prevent the bolts 34 from backing out while installed in the bracket assembly 10 as it rotates on the shaft D. Details of the medial spacers 28 and bracket assembly bolts 34 are shown most clearly in FIG. 3 of the drawings.

It will be seen that additional fittings must be installed between the various bracket portions 12 through 18 to provide adequate attachment, and also to provide for securing the opposed bracket portions 12, 14 and 16, 18 to one another around the drive shaft D. Accordingly, a series of bracket portion clamp fittings are provided for this purpose, as shown in detail in FIG. 3.

The clamp fittings comprise a series of identical first and second end spacers 36, with their only difference being the location of their installation in either the first ends 20 or the second ends 22 of the spacer portions 12 through 18. Each of the first and second end spacers 36 also includes a threaded axial passage 30 formed concentrically therethrough; the end spacers 36 may be substituted for the medial spacers 28, if so desired. However, each of the end spacers 36 also includes a diametric passage 38 formed therethrough for the installation of bracket clamping bolts, as explained further below.

Each of the ends 20 and 22 of the bracket portions 12 through 18 includes at least one, and preferably two, end spacer attachment passages 40 formed therethrough. These end spacer attachment passages 40 are also preferably counterbored in their facing surfaces, in the manner of the medial passages 32 described further above. The end spacers 36 are placed in the counterbores of the end spacer attachment passages 40 of the facing bracket portions 12 through 18, to secure the first and second ends 20, 22 of the first and third bracket portions 12, 16 and the first and second ends 20, 22 of the second and fourth bracket portions 14, 18 together. The bracket and spacer assemblies are secured by additional bracket assembly bolts 34, identical to the bolts 34 used with the medial spacers 28. As in the case of the bolts 34 used to secure the medial spacers 28 between their respective bracket portions, these end spacer bracket assembly bolts 34 have drilled heads for safety wiring, or some other means is provided to prevent their backing out during operation of the machine.

The diametric holes 38 of corresponding spacers 36 are aligned with one another during assembly, to provide for the attachment of the two subassemblies comprising first and third bracket portions 12 and 16 and second and fourth bracket portions 14 and 18 to one another. A corresponding number of bracket first and second end clamping bolts 42 are installed through each pair of end spacers 36, with each spacer pair comprising an opposed spacer of the first end 20 of the first and third bracket portion 12, 14, an opposed spacer of the second end 22 of the those bracket portions 12 and 14, an opposed spacer of the first end 20 of the second and fourth bracket portion 16, 18, and an opposed spacer of the second end 22 of the those bracket portions 16 and 18. Each of the bracket end clamping bolts 42 includes a head 44 which abuts one of the end spacers 36 when installed therewith, and a lock nut 46 secured to the opposite end of each clamping bolt 42 and abutting the corresponding opposite end spacer 36. The lock nuts 46 are tightened on the clamping bolts 42 to clamp the corresponding end spacers 36 to one another and affix the bracket subassemblies 12, 16 and 14, 18 to the shaft D.

Each of the bracket portions 12 through 18 includes at least one, and preferably a series of, lubricator installation passages 48 formed therethrough, in a circumferential pattern between the first and second ends 20 and 22 and between the inner and outer diameters 24 and 26 of the bracket portions. The number of lubricator passages 48 is equal to twice the number of automatic lubricator devices L to be installed therein, with each lubricator device L being captured by a pair of axially concentric passages 48 in adjacent parallel bracket portions, e.g. first and third bracket portions 12 and 16, etc. The number of lubricator devices L to be provided is dependent upon the number of lubrication points to be serviced. Where the present invention is installed between two universal joints to lubricate both joints, a total of eight lubricators L will be required for the four bearing assemblies of each of the two joints. Obviously, the present lubricating system may be configured to hold other numbers of lubricators L, as desired.

The lubricator devices L used with the present invention are conventional, with the present invention being capable of accepting and operating with a number of different types and models. An exemplary model is the Perma Star®, which provides lubrication intermittently at predetermined intervals in accordance with an integral timer mechanism in each unit. Such lubricators may be adjusted at the time of installation (or at other times as desired) to provide lubrication over a time period ranging from a few days up to a year. Other models of automatic lubricators, e.g. those where the dispensing of lubricant is controlled by an integral receiver which receives a signal from a remotely located and relatively stationary transmitter, or automatic lubricators manufactured by another manufacturer(s), may be substituted for the exemplary Perma Stars lubricator L, as desired. In any event, a critical feature of the automatic lubricators used with the present invention is that they be capable of dispensing lubricant at intervals over a relatively lengthy period of time, without need for any structural physical connection (e.g., electrical wiring) to a triggering device, as the lubricators L rotate with the rotating drive shaft D during operation.

The lubricators L are installed in the lubricator passages 48 of the bracket portions 12 through 18 before those portions are assembled to one another. Rubber or plastic grommets 50 are installed in each of the lubricator passages 48, to hold the lubricators L firmly within the device without applying clamping pressures which might distort or damage the devices. The exemplary Perma Star® lubricators used with the present invention, include a medial band M having a somewhat larger diameter than the majority of the device. This larger diameter medial band M facilitates the installation of the lubricators L in the bracket portions 12 through 18, as the medial band M is captured between the two spaced apart and axially concentric lubricator passages 48 to prevent axial movement of the lubricators L within the lubricator passages 48. Other means of preventing lubricator movement may be provided alternatively, e.g. hose clamps or the like secured about the lubricators, etc.

Assembly of the present lubrication system 10 is accomplished by first installing the grommets 50 in the lubricator passages 48 in each of the lubricator passages 48, and then passing one of the axially concentric lubricator passages 48 of two opposed bracket portions, i.e. portions 12 and 16 or 14 and 18, over the opposite ends of the lubricators L. The medial spacers 28 and first and second end spacers 36 are then placed between the opposed bracket portions 12, 16 and 14, 18, and secured in place by the bracket assembly bolts 34. These bolts 34 may be safety wired or in pairs or otherwise secured at this time, to prevent their backing out during operation of the machine.

When the parallel bracket portions 12, 16 and 14, 18 have been assembled with the lubricators L captured therein, the bracket portion subassemblies 12, 16 and 14,18 may be assembled on the drive shaft D. This is accomplished by installing the first and second end clamping bolts 42 through the diametric passages 38 of the first and second end spacers 36, and tightening the lock nuts 46 thereon. The inner circumference of the bracket portions is slightly less than the circumference of the drive shaft D, so the bracket portion assemblies 12, 16 and 14, 18 may be drawn up tightly on the drive shaft D without their adjacent first and second ends 20 and 22 contacting one another.

At this point, the lubrication supply lines may be installed, generally as indicated in FIGS. 1 and 2 of the drawings. Each of the bracket portions 12 through 18 includes a series of lubrication line passages therethrough. All four of the bracket portions 12 through 18 are identical to one another with the exception of the arrangement of the lubrication line passages therethrough, shown in FIG. 3. The coplanar first and third bracket portions 12 and 16 each include two relatively smaller lubrication line anchor passages 52 placed toward the inner edge of the bracket portions 12 and 16, and two relatively larger lubrication line clearance passages 54 positioned radially outwardly from the bulkhead fitting passages 52. These passages are reversed in the second and fourth bracket portions 14 and 18, with the smaller anchor passages 52 being placed toward the outboard edges and the larger line clearance passages placed toward the inboard edges of the two portions 14 and 18.

The reason for this placement is shown more clearly in FIG. 1. The series of automatic lubricators L installed in the apparatus 10 are placed with their outlet ports 56 staggered in opposite directions, i.e. every other unit L has the port 56 oriented to the right side of the installation, with those units L in between, having their ports 56 oriented to the left side. Each of the lubricators L has an outlet elbow 58 installed thereon, to which a lubricant supply line is connected.

As the entire apparatus and drive line D are rotating at perhaps a relatively high RPM, it is critical that the lubricant supply lines be anchored securely in some manner. Otherwise, the mass of the supply lines would impose a significant outward radial load on the lubricator L outlet ports, possibly damaging the assembly. Accordingly, each of the lubricant supply lines is supported by a bulkhead pass through fitting 60 installed in the smaller anchor passages 52 of the bracket portions 12 through 18, with the lines passing through the larger clearance passages 54 which are axially aligned with the corresponding anchor passages and bulkhead fittings 60.

It will be noted in FIGS. 1 and 2 that the lubrication supply lines 62 extending from the right hand lubricator outlets 56 and elbows 58, reverse direction to pass through the larger diameter clearance passages 54 to the inboard in the second and fourth bracket portions 16 and 18 to the right, and are anchored by the inboard bulkhead fittings 60 installed in the first and third bracket portions 12 and 14 to the left before extending to the left where they are connected to elbows 64 extending from the universal joint trunnions T and their bearing assemblies therein. The lubricant supply lines 66 extending from the left hand lubricator outlets 56 and elbows 58, reverse direction to pass through the larger diameter clearance passages 54 to the outboard in the first and third bracket portions 12 and 14 to the left, and are anchored by the outboard bulkhead fittings 60 installed in the second and fourth bracket portions 16 and 18 to the right before extending to the right where they connect to a universal joint assembly (not shown) similar to the assembly J illustrated in FIG. 1, or other apparatus on the drive shaft D which requires periodic lubrication.

The lubrication supply lines 62 and 66 may be formed of relatively rigid material, such as the tubing used to form the supply lines 66, or may alternatively be formed of relatively flexible line material, as used to form the supply lines 62. The material and configuration of the lines is not critical, so long as they are supported or secured to the remainder of the rotating structure in order to avoid damage due to centrifugal loads during operation.

In conclusion, the present lubricating system serves to greatly reduce down time on large rotating machine components, by significantly reducing the manual maintenance which would otherwise be required to lubricate various bearings and components periodically. The present system also assures that each separate bearing assembly receives lubrication as required from a separate, dedicated lubrication source or supply, which rotates in unison with the bearing and supplies lubrication as needed while the machine is in operation. The automatic lubricators used with the present invention are capable of supplying lubricant for extended periods of time, perhaps up to a year. Lubricant quantity may be checked while the machine is in operation by means of a strobe light synchronized with the rotation speed of the shaft, or perhaps a digital camera or other means as desired. When the lubricant is depleted, the bracket assembly is easily removed and the lubricators refilled or replaced as desired. Alternatively, replacement bracket subassemblies with fresh lubricators installed therein may be provided, which would only require the connection of the first and second end clamping bolts and the lubricant supply lines to the lubricators. Such prefabricated subassemblies would save further on the limited down time which is infrequently required when using the present invention.

The present lubrication system is particularly well suited for installation on very large papermaking machinery, where operation is continuous or nearly so. Such machines generally produce significant revenue during their operation. Accordingly, the downtime associated with the periodic maintenance of such machinery, and the downtime associated with repair when damage occurs due to lack of lubrication, is economically significant to operations using such machinery. Thus, the present lubrication system will be greatly appreciated by various industries where continuous or nearly continuous, maintenance free operation of rotating machinery is critical to the industry.

It is to be understood that the present invention is not limited to the embodiment described above, but encompasses any and all embodiments within the scope of the following claims.

We claim:

1. A lubricating system affixed to and rotating with a rotary shaft having a plurality of lubricated bearings, the lubricating system comprising:
    a first bracket portion;
    a second bracket portion diametrically opposite said first bracket portion, and coplanar therewith;
    a third bracket portion, axially spaced apart from said first bracket portion and parallel thereto;
    a fourth bracket portion diametrically opposite said third bracket portion, and coplanar therewith;
    each said bracket portion having a semicircular configuration with a first end, a second end opposite said first end, an inner diameter adapted for mounting on the rotary shaft, and an outer diameter larger than said inner diameter;
    each said bracket portion further including at least one automatic lubricator passage disposed therethrough, between said inner diameter and said outer diameter;
    an automatic lubricator disposed within each said automatic lubricator passage;
    a lubrication line extending from each said automatic lubricator to each of the rotary shaft bearings;
    a plurality of bracket portion spacer fittings for securing together and spacing apart said first and said third bracket portion from one another, and for securing together and spacing apart said second and said fourth bracket portion from one another; and
    a plurality of bracket portion clamp fittings for securing said first and said second bracket portion together and for securing said second and said fourth bracket portion together, and clamping the rotary shaft immovably within and relative to said first through said fourth bracket portion.

2. The lubricating system according to claim 1, wherein said plurality of bracket portion spacer fittings comprises:
    at least one medial spacer disposed between said first and said third bracket portion and between said second and said fourth bracket portion;
    each said medial spacer further including a threaded axial passage formed concentrically therethrough;
    each said bracket portion further including at least one medial spacer attachment passage therethrough; and
    a plurality of bracket assembly bolts securing each said bracket portion to each said medial spacer.

3. The lubricating system according to claim 1, wherein said plurality of bracket portion clamp fittings comprises:
    at least one first end spacer disposed between said first and said third bracket portion and between said second and said fourth bracket portion;
    at least one second end spacer disposed between said first and said third bracket portion and between said second and said fourth bracket portion;
    each said first end spacer and each said second end spacer further including a threaded axial passage formed concentrically therethrough and a passage formed diametrically therethrough;
    each said end of each said bracket portion further including at least one spacer attachment passage formed therethrough;
    a plurality of bracket assembly bolts securing each said bracket portion to each said first end and second end spacer;
    a plurality of bracket first end clamping bolts disposed diametrically through each said first end spacer;
    a plurality of bracket second end clamping bolts disposed diametrically through each said second end spacer; and
    each of said bolts having a head end and a nut secured opposite said head end and clamping corresponding said first end and said second end spacers therebetween, thereby clamping said first through said fourth bracket portion about the rotary shaft.

4. The lubricating system according to claim 1, further including a grommet disposed within each said automatic lubricator passage.

5. The lubricating system according to claim 1, wherein each said bracket portion further includes:
    a plurality of lubrication line clearance passages formed therethrough;
    a plurality of lubrication line anchor passages formed therethrough; and
    each of said lubrication line anchor passages further including a bulkhead fitting installed therein.

6. The lubricating system according to claim 1, wherein each said automatic lubricator is controlled by an internal timer.

7. The lubricating system according to claim 1, wherein each said automatic lubricator is controlled by an internal receiver receiving signals from an external transmitter.

8. The lubricating system according to claim 1, wherein each said bracket portion is formed of aluminum.

9. A rotating shaft having a plurality of lubricated bearings thereon and a lubricating system affixed thereto and rotating therewith, comprising in combination:
    a rotating drive shaft having a first bearing end and a second bearing end opposite said first bearing end;
    a first plurality of rotating bearings disposed at said first bearing end;
    a second plurality of rotating bearings disposed at said second bearing end;
    a first bracket portion;
    a second bracket portion opposite said first bracket portion, and coplanar therewith;
    a third bracket portion, spaced apart from said first bracket portion and parallel thereto;

a fourth bracket portion opposite said third bracket portion, and coplanar therewith;

each said bracket portion having a semicircular configuration with a first end, a second end opposite said first end, an inner diameter essentially equal to the diameter of the rotary shaft, and an outer diameter larger than said inner diameter;

each said bracket portion further including at least one automatic lubricator passage disposed therethrough, between said inner diameter and said outer diameter;

an automatic lubricator disposed within each said automatic lubricator passage;

a lubrication line extending from each said automatic lubricator to each of said rotating bearings;

a plurality of bracket portion spacer fittings for securing together and spacing apart said first and said third bracket portion from one another, and for securing together and spacing apart said second and said fourth bracket portion from one another; and a plurality of bracket portion clamp fittings for securing said first and said second bracket portion together and for securing said second and said fourth bracket portion together, and clamping said rotating drive shaft immovably within and relative to said first through said fourth bracket portion.

10. The rotating shaft and lubricating system combination according to claim 9, wherein said plurality of bracket portion spacer fittings comprises:

at least one medial spacer disposed between said first and said third bracket portion and between said second and said fourth bracket portion;

each said medial spacer further including a threaded axial passage formed concentrically therethrough;

each said bracket portion further including at least one medial spacer attachment passage therethrough; and a plurality of bracket assembly bolts securing each said bracket portion to each said medial spacer.

11. The rotating shaft and lubricating system combination according to claim 9, wherein said plurality of bracket portion clamp fittings comprises:

at least one first end spacer disposed between said first and said third bracket portion and between said second and said fourth bracket portion;

at least one second end spacer disposed between said first and said third bracket portion and between said second and said fourth bracket portion;

each said first end spacer and each said second end spacer further including a threaded axial passage formed concentrically therethrough and a passage formed diametrically therethrough;

each said end of each said bracket portion further including at least one spacer attachment passage formed therethrough;

a plurality of bracket assembly bolts securing each said bracket portion to each said first end and second end spacer;

a plurality of bracket first end clamping bolts disposed diametrically through each said first end spacer;

a plurality of bracket second end clamping bolts disposed diametrically through each said second end spacer; and each of said bolts having a head end and a nut secured opposite said head end and clamping corresponding said first end and said second end spacers therebetween, thereby clamping said first through said fourth bracket portion about the rotary shaft.

12. The rotating shaft and lubricating system combination according to claim 9, further including a grommet disposed within each said automatic lubricator passage.

13. The rotating shaft and lubricating system combination according to claim 9, wherein each said bracket portion further includes:

a plurality of lubrication line clearance passages formed therethrough;

a plurality of lubrication line anchor passages formed therethrough; and each of said lubrication line anchor passages further including a bulkhead fitting installed therein.

14. The rotating shaft and lubricating system combination according to claim 9, wherein each said automatic lubricator is controlled by an internal timer.

15. The rotating shaft and lubricating system combination according to claim 9, wherein each said automatic lubricator is controlled by an internal receiver receiving signals from an external transmitter.

16. The rotating shaft and lubricating system combination according to claim 9, wherein each said bracket portion is formed of aluminum.

17. The rotating shaft and lubricating system combination according to claim 9, wherein said first and said second plurality of rotating bearings disposed respectively at said first and said second bearing end of said rotating drive shaft, each comprise a plurality of universal joint trunnion bearings.

* * * * *